June 20, 1933.  T. S. MILLER ET AL  1,914,521
HOISTING STRUCTURE FOR GROUND WORKING IMPLEMENTS
Original Filed May 17, 1932   3 Sheets-Sheet 1

INVENTORS
T. S. Miller, Look L. Chong
Jue L. Chong and Sam L. Chong
BY
ATTORNEY

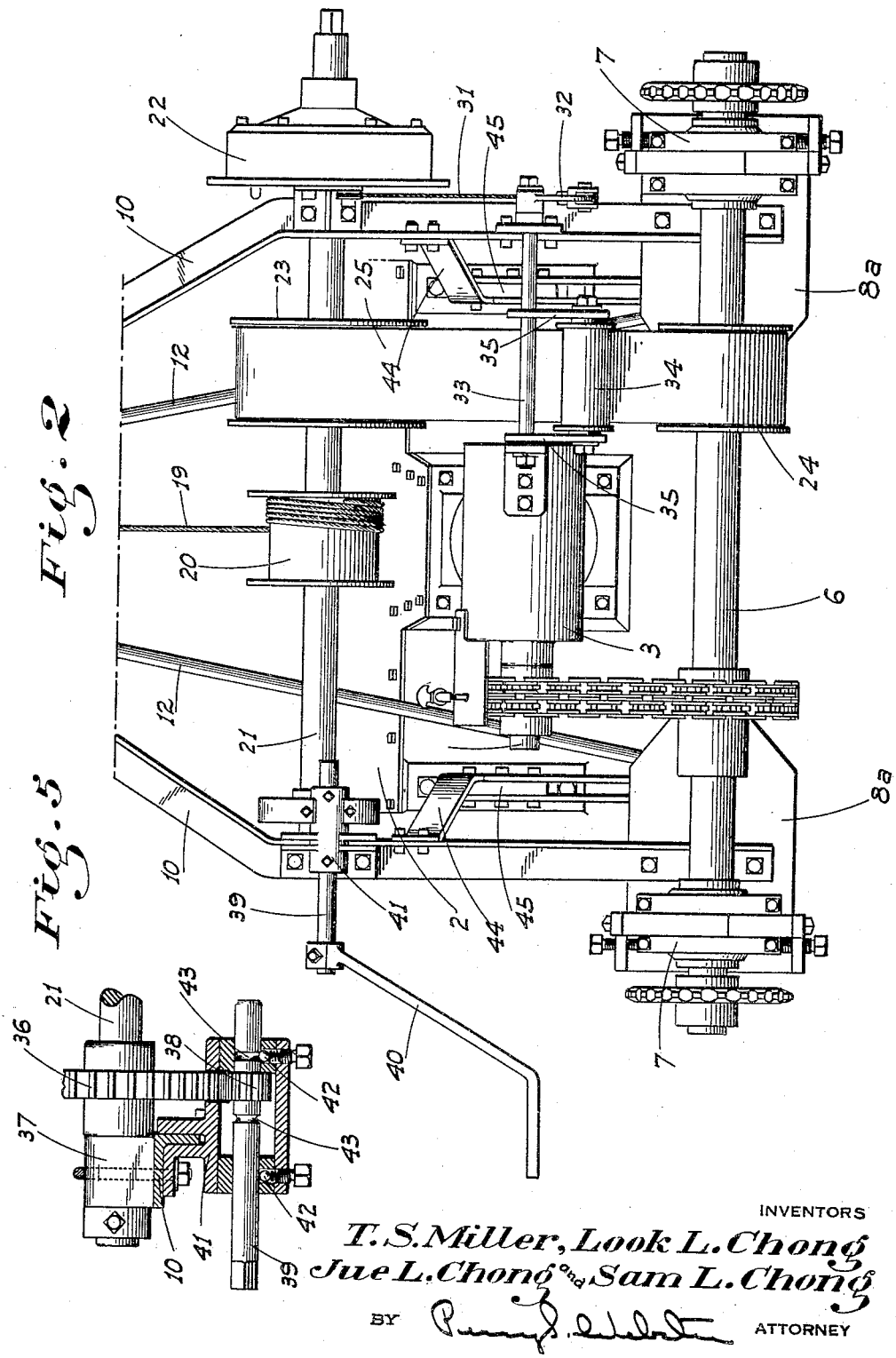

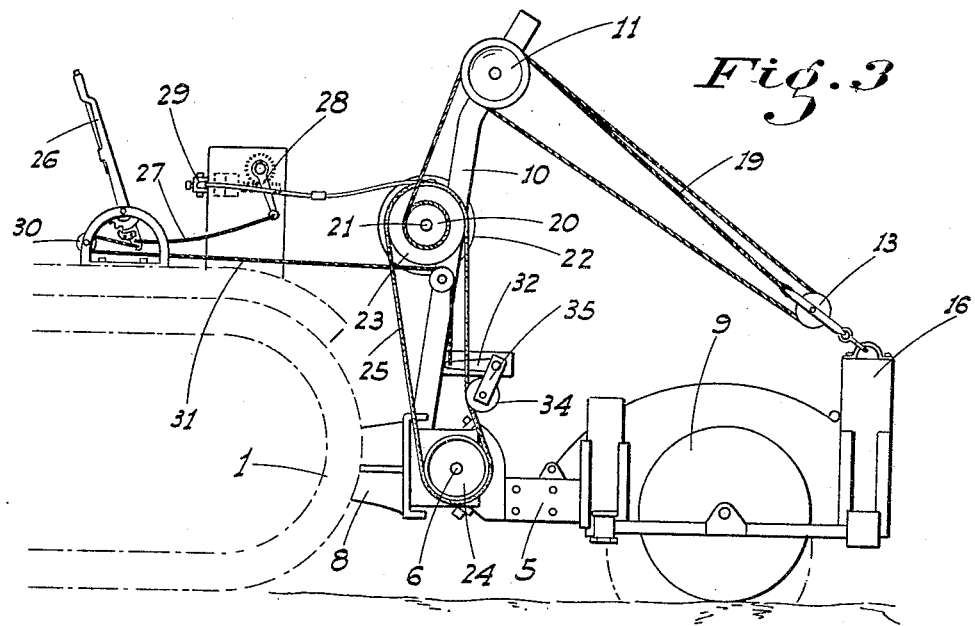
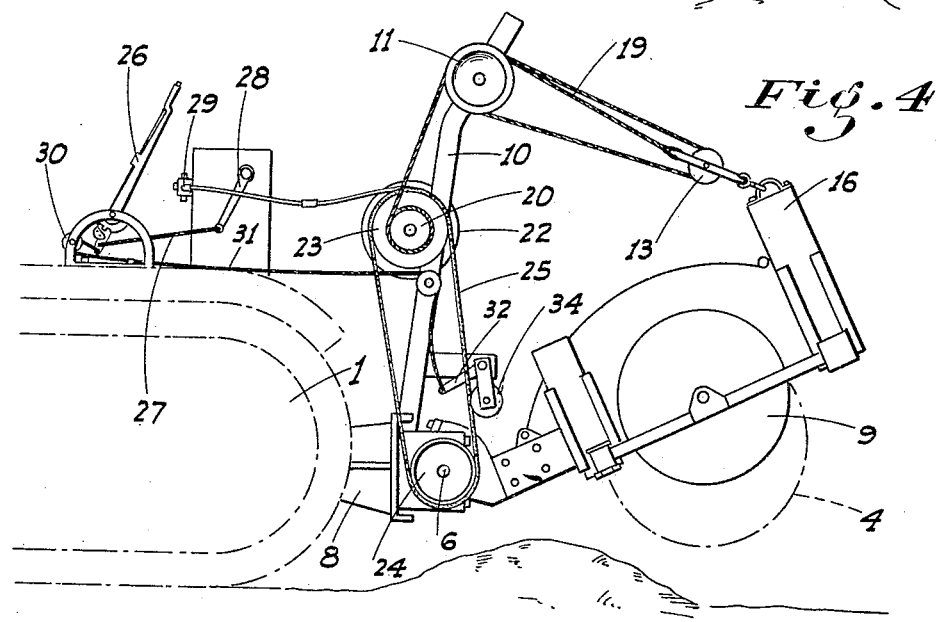

Patented June 20, 1933

1,914,521

UNITED STATES PATENT OFFICE

TONY S. MILLER, LOOK L. CHONG, JUE L. CHONG, AND SAM L. CHONG, OF ISLETON, CALIFORNIA

HOISTING STRUCTURE FOR GROUND WORKING IMPLEMENTS

Original application filed May 17, 1932, Serial No. 611,840. Divided and this application filed October 7, 1932. Serial No. 636,638.

This invention relates to agricultural implements of that general character in which the implement is pivotally mounted on the tractor and is arranged to be raised or lowered when necessary by a hoisting mechanism on the tractor. The invention deals with such a hoisting mechanism and is a division of our co-pending application for patent, Serial No. 611,840, filed May 17, 1932.

Our main object is to provide a power or tractor operated mechanism of this character so arranged that the implement may be easily and quickly raised or lowered at a controlled speed, and may be held raised as long as desired without relying on the power or operation of the tractor. We have also arranged a simple but effective form of hand hoisting means which may be used when the tractor is not operating, or in other emergencies.

These objects we accomplish by means of such structure and relative arrangement of parts as will fully appear by a perusal of the following specification and claims.

In the drawings similar characters of reference indicate corresponding parts in the several views:

Fig. 2 is a fragmentary transverse elevation of the frame supporting and hoisting structure.

Figs. 3 and 4 are diagrammatic side views showing the double operation of the hoist control lever.

Fig. 5 is a plan view of the manually operated hoist mechanism with certain parts in section.

Figure 1:
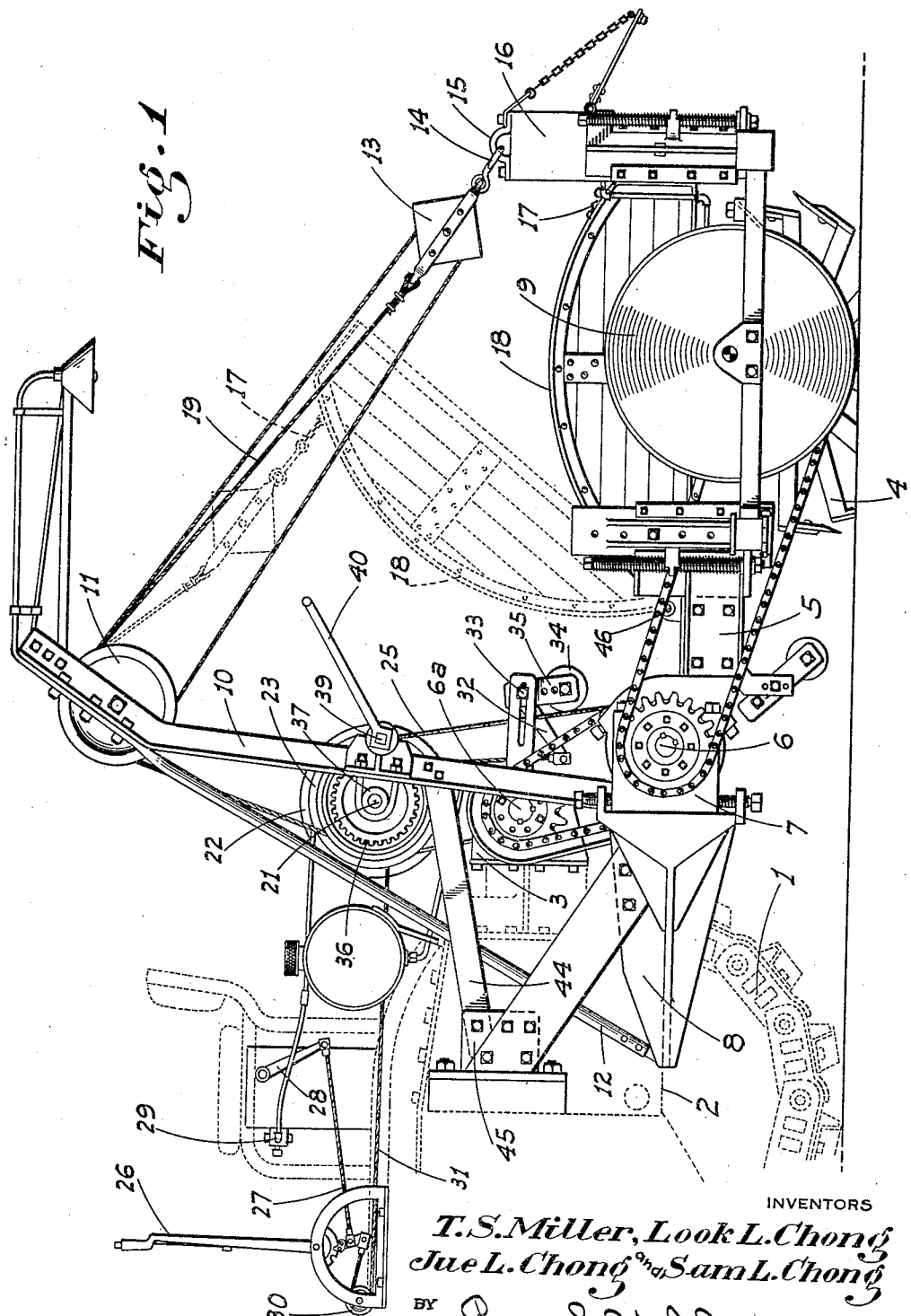
Fig. 1 is a side elevation of the complete apparatus as in operation.

Referring now more particularly to the characters of reference on the drawings, the tractor 1 is preferably of the endless track type having a large cast housing 2 between the tracks and which terminates at its rear end in a gear box 3 as usual.

The rotary implement is indicated generally at 4 and is mounted on a frame 5 which is pivoted at its forward end in axial connection with the drive shaft 6 from which the implement is driven and which is itself driven from the shaft 6a projecting laterally from the gear box 3.

The shaft 6 is supported in bearing blocks 7 mounted in connection with a heavy bracket plate or frame 8 secured to the under side of the housing 2. The rotary digging unit is normally supported at a certain level relative to the ground by side rollers 9 and may be raised so as to be entirely clear of the ground by the following means.

Secured to and upstanding from the rear vertical flanges 8a of the bracket plate are transversely converging derrick arms 10 between which adjacent their upper ends a sheave block 11 of a block and tackle is supported. The arms are braced against rearward movement by bars 12 extending from the top of the arms to connections with the plate 8 adjacent its forward corners. The other block 13 of the tackle has a hook 14 to detachably engage an eye 15 formed on top of the rear cross member 16 of the frame 5 or a chain link 17 or the like on the hood 18 of the digging unit adjacent its rear end. A cable 19 passes about the sheaves of the block and tackle in the usual manner and then down to and about a drum 20. This drum is secured on a shaft 21 supported from the arms 10 in a horizontal plane substantially midway between the upper sheave block 11 and the shaft 6. A hydraulic brake unit 22 of standard character is mounted on one end of the shaft 21. A belt pulley 23 is mounted on the shaft 73 and another cooperating pulley 24 is on the shaft 6, with a normally slack belt 25 therebetween.

If the belt is tightened against the pulley therefore while the shaft 6 is driven, the shaft 21 will be rotated and the digging unit raised. If the belt is then allowed to run slack the unit will drop of its own weight. The raising of the unit and the subsequent lowering of the same at a controlled speed is controlled by the operator of the tractor in the following manner.

Pivoted intermediate its ends on the tractor in a position convenient to the operator is a vertical lever 26. A flexible element 27 extends rearwardly from the lower end of this lever and is connected to the operating arm 28 of the fluid control mechanism 29 of the hydraulic brake unit 22. This mechanism is of standard character as is the brake itself, and the arm 28 is arranged so that when pulled in one direction the fluid is fed to the brake unit and the brake is applied.

Projecting forwardly from the lower end of the lever and then about a fixed direction changing pulley 20 is another flexible element 31. This element at its rear end is applied to an arm 32 depending from a transverse shaft 33 suitably journaled from one of the arms 10 and the box 3 back of the belt 25. An idler roller 34 to engage the belt is supported between arms 35 depending from said shaft 33. Therefore, when said element 31 is pulled the idler will be advanced against the belt to place the same under tension and in driving relation with the pulleys 24 and 25. When the lever 26 is pushed forwardly as in Fig. 4 therefore said element 31 is actuated to cause the drum shaft 21 to be driven and the unit raised, while the brake is released. Said idler pulley and belt arrangement is therefore practically a form of clutch. Disengaging the usual control clutch of the shaft 6a then enables the unit to be held raised as the lever is retained in its forward position and the belt clamped against the pulleys.

When the lever is pushed back, whether the shaft 6a is driven or not, the idler will be released but the brake will be applied, with a force corresponding to the extent to which the lever is thus moved, and so allowing the unit to be lowered to its normal position gently and easily.

It may at times be desirable to raise the unit when the engine is not running so we provide an emergency hand operated means for rotating the shaft 21, as shown in Fig. 5. This means comprises a gear 36 fixed on the shaft 21 adjacent one of the end bearings 37 thereof, said bearings being secured against the forward face of the derrick arms 10. This gear engages a pinion 38 fixed on a hand shaft 39 provided at its outer end with a removable crank handle 40. The shaft 39 is slidably supported in the ends of a housing 41 in which the pinion is enclosed and which is clamped against the rear face of the adjacent arm 10, the gear projecting into the housing for engagement with the pinion. The length of the housing is sufficient to enable the pinion to be slid clear of the same by longitudinal movement of the shaft 39. It is normally held either in its engaged or disengaged position by spring pressed elements 42 mounted in the housing adjacent its ends to alternately engage circumferential grooves 43 in the shaft, said grooves being those always concealed between the ends of the housing and being thus free from exposure to the clogging action of dirt from the outside. Normally the pinion is retracted from the gear so that when the hoist is operated by power the pinion and handle of the shaft will not turn. To brace the derrick arms agains possible deflection in the plane of the shaft 21 brace bars 44 extend from the arms 10 adjacent the bearings 37 to brackets 45 mounted in connection with the housing 2 to the sides of the same.

If it is desired to raise the hood for the inspection of the cutting unit without raising the latter from the ground the hook 14 may be disengaged from the eye 15 and applied to the link or eye 17. The operation of the hoisting mechanism then raises the hood about its forward pivotal connection 46 with the frame 5 as shown in dotted lines in Fig. 1.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. In an agricultural implement, a supporting member, a digger supporting frame pivoted on and projecting rearwardly from said member, a hoist structure for raising said frame and including a cable drum; a shaft on which said drum is mounted, disengageable drive means for turning the shaft control means to place said drive means in or out of operation, a brake structure associated with the shaft, a single pivoted lever, and connections between said lever and the control means and brake structure arranged so that a movement of the lever in one direction will cause the shaft to be driven and the brake released, and vice versa.

2. In an agricultural implement, a supporting member, a digger supporting frame pivoted on and projecting rearwardly from said member, a hoist structure for raising said frame and including a cable drum; a shaft on which said drum is mounted, disengageable drive means for turning the shaft, control means to place said drive means in or out of operation, and including a pivoted arm; a brake structure associated with the shaft, control means for the structure including a pivoted arm, a single pivoted lever mounted ahead of both arms, a flexible element between said lever and the brake control arm, whereby said arm will be pulled by the movement of the lever in one direction only, a flexible element extending forwardly from the lever and then back to the drive control arm, and a direction changing member about which said last named element passes ahead of the lever whereby said last named arm will only be pulled when the lever is moved in the opposite direction; both said control means being normally idle.

3. In an agricultural implement, a supporting member, a digger supporting frame pivoted on and projecting rearwardly from said member, a hoist structure for raising said frame and including a cable drum; a shaft on which said drum is mounted, power means for rotating said shaft, a gear on said shaft, a pinion to engage said gear, a hand shaft connected to the pinion, and means supporting said hand shaft for longitudinal sliding movement whereby to move said pinion in or out of mesh with the gear.

4. In an agricultural implement, a supporting member, a digger-supporting frame pivoted on and projecting rearwardly from said member, a hoist derrick rigid with and projecting upwardly from said member, a driven transverse shaft mounted in connection with said member, another transverse shaft mounted on the derrick in spaced relation to the driven shaft, a cable drum on said other shaft, a block and tackle unit for engagement with the digger frame supported from the upper end of the derrick and including a cable wound about the drum, pulleys on the shafts, a normally loose belt between the pulleys, an idler engaging the belt, a brake structure applied to the drum shaft, and a common means operable at will to force the idler against the belt to take up the slack and to apply the brake, alternately and selectively.

5. In an agricultural implement, a supporting member, a frame pivoted on and projecting rearwardly from said member for raising and lowering movement, a pair of shafts mounted in connection with said member, one of the shafts being driven; a hoist structure for said frame including a cable drum on the other shaft, pulleys on the shafts, a normally loose belt about the pulleys, an idler engaging the belt, a brake structure applied to the drum shaft, and a common means operable at will to force the idler against the belt and to apply the brake, alternately and selectively.

6. In an agricultural implement, a supporting member, a frame pivoted on and projecting rearwardly from said member for raising and lowering movement, a pair of shafts mounted in connection with said member, one of the shafts being driven; a hoist structure for said frame including a cable drum on the other shaft, pulleys on the shafts, a normally loose belt about the pulleys, an idler engaging the belt, hand means operable at will and applied to the idler to force the same against the belt, and brake means operable at will to control the rotation of the drum shaft when the idler is slack.

In testimony whereof we affix our signatures.

TONY S. MILLER.
LOOK L. CHONG.
JUE L. CHONG.
SAM L. CHONG.